June 10, 1969      A. M. STOTT      3,449,165
BATTERY
Filed Feb. 9, 1968
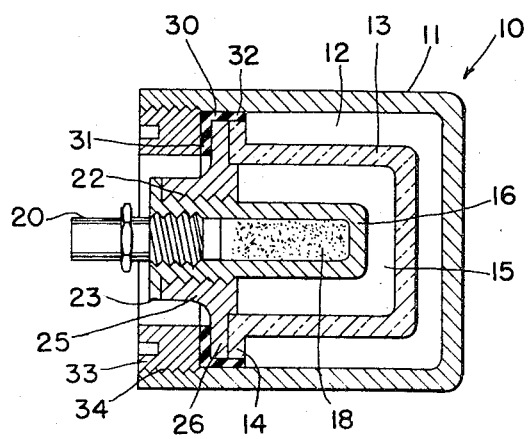
INVENTOR.
ALBERT M. STOTT 3,449,165
BATTERY
Albert M. Stott, Southampton, Pa., assignor to the United States of America as represented by the Secretary of the Army
Filed Feb. 9, 1968, Ser. No. 704,464
Int. Cl. H01m 35/00
U.S. Cl. 136—6                                              3 Claims

ABSTRACT OF THE DISCLOSURE

A rechargeable pyrotechnic thermal battery in which electrical potential is developed by a pyrotechnic heating device melting the sodium in a sodium sulphur cell. The sodium ions pass through a ceramic material to the sulphur in a porous medium.

---

The invention described herein may be manufactured, used, and licensed by or for the Government for governmental purposes without the payment to me of any royalty thereon.

This invention relates to a battery and, more particularly to a thermal battery which is readily rechargeable and reloadable and has a variety of uses including that of supplying the electrical potential for an electronic time delay element.

It is an object of the invention to provide a minimum sized thermal battery that develops a maximum of electrical energy.

Another object of the invention is to provide such a battery which develops full poential in a minimum of time.

These and other objects, features and advantages will become more apparent from the following description and accompanying drawings which is a sectional view of a preferred battery embodying the principles of the invention.

The pyrotechnic thermal battery, shown generally at 10, has a cylindrically shaped outer casing or receptacle 11. A substantial inner surface portion of the receptacle is lined or covered with a sulphur filled porous electrode (positive) 12 which is of smaller cylindrical dimensions than and seats or bottoms in the base of the casing. A yet slightly smaller cylindrical cup-like body of sodium ion conducting ceramic material 13 whose open end is provided with an outwardly extending annular lip or flange 14 for overlying or seating upon a portion of the end or edge surface of the porous electrode 12. The ceramic cup 13 contains a bed of sodium 15, preferably in a solid state, into which is immersed one end of a relatively smaller cylindrical thermal chamber element 16 that has secured therein or otherwise contains a pyrotechnic or propellant charge 18.

Preferably, an electric ignition element 20 is threadedly secured in the central opening of element 16 for igniting the pyrotechnic 18. The outer surface of element 16 has a raised threaded portion 22 that terminates in an outwardly extending annular flange 23 at the open end of the element 16. This enables threaded attachment of the internally threaded hub portion 25 of annular disc 26 upon the externally threaded thermal chamber element 16. To properly position the pyrotechnic arrangement when the disc 26 has its radially extending flange portion in alignment with or overlying the ceramic material flange 14.

An annulus of dielectric or electrical insulating material 30 is provided having a laterally disposed ring portion 31, positioned intermediate the disc radial portion and the adjacent surface of an annular retaining nut 33 threadedly secured to a matingly threaded receptacle internal surface portion 34 adjacent the casing open end, and an integral longitudinally extending insulating portion 32 that is intermediately positioned to prevent electrical continuity between both the disc 26 and the ceramic flange 14 and the casing wall 11 which is also considered the positive terminal.

When the pyrotechnic 18 is ignited within the thermal chamber element 16 (which is considered the negative terminal), the rapidly developed heat therein will transfer and quickly melt the sodium of bed 15. When the sodium melts, its ions are conducted through the ceramic material 13 toward the sulphur filled porous electrode 12, whereupon the sodium and sulphur react in a manner to rapidly provide an electrical potential.

Various modifications, changes or alterations may be resorted to without departing from the scope of the invention as defined in the appended claims.

I claim:

1. In a thermal battery having a cylindrically shaped receptacle containing a sulphur filled porous electrode covering a substantial inner surface portion of said receptacle, a sodium ion conducting ceramic material overlying said electrode and contaning a sodium bed, a cylindrical thermal chamber having one end thereof immersed in said sodium, means extending laterally from said chamber and receptacle for retaining said ceramic and sodium materials in a predetermined position, pyrotechnic means for developing heat energy positioned in said thermal chamber, and means secured to said chamber for igniting said pyrotechnic means, so constructed and arranged that upon ignition of said pyrotechnic and heating of said sodium, sodium ions are conducted through said ceramic to the sulphur of said electrode to establish electrical potential in said battery.

2. The structure of claim 1 wherein said ceramic material is a cylindrical cup-shaped body having an outwardly extending annular flange overlying a portion of an edge surface of said electrode.

3. The structure of claim 2 in which an external surface of said chamber has a threaded portion, said receptacle has an internally threaded surface portion, said retaining means includes an annular nut secured to said receptacle threaded portion and a disc having a centrally threaded hub secured to said externally threaded chamber, said disc having a radially extending flange portion overlying said ceramic material annular flange and underlying said annular nut, and means insulating said disc and ceramic material from said receptacle and annular nut.

References Cited

UNITED STATES PATENTS 2,102,701   12/1937   Gyoris _____ 136—83.1
3,132,971    5/1964   Selis et al. _____ 136—83

WINSTON A. DOUGLAS, Primary Examiner.

C. F. LE FEVOUR, Assistant Examiner.

U.S. Cl. X.R.

136—83, 90